(12) United States Patent
Ding et al.

(10) Patent No.: US 10,763,761 B2
(45) Date of Patent: Sep. 1, 2020

(54) CHARGING METHOD FOR SUB-MODULE BASED HYBRID CONVERTER

(71) Applicants: NR ELECTRIC CO., LTD, Jiangsu (CN); NR ENGINEERING CO., LTD, Jiangsu (CN)

(72) Inventors: Jiudong Ding, Jiangsu (CN); Yu Lu, Jiangsu (CN); Yunlong Dong, Jiangsu (CN); Haiying Li, Jiangsu (CN); Jie Tian, Jiangsu (CN); Defeng Qiu, Jiangsu (CN); Tiangui Jiang, Jiangsu (CN); Jianyang Lian, Jiangsu (CN)

(73) Assignees: NR ELECTRIC CO., LTD., Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 16/469,086

(22) PCT Filed: Jan. 12, 2018

(86) PCT No.: PCT/CN2018/072417
§ 371 (c)(1),
(2) Date: Jun. 12, 2019

(87) PCT Pub. No.: WO2018/130205
PCT Pub. Date: Jul. 19, 2018

(65) Prior Publication Data
US 2020/0076321 A1   Mar. 5, 2020

(30) Foreign Application Priority Data
Jan. 16, 2017 (CN) .......................... 2017 1 0029574

(51) Int. Cl.
*H02M 7/219*   (2006.01)
*H02J 7/02*     (2016.01)
*H02J 7/34*     (2006.01)
*H02J 7/10*     (2006.01)

(52) U.S. Cl.
CPC ............ *H02M 7/219* (2013.01); *H02J 7/022* (2013.01); *H02J 7/345* (2013.01); *H02J 2007/10* (2013.01)

(58) Field of Classification Search
CPC .......... H02M 7/02; H02M 7/04; H02M 7/155; H02M 7/2019; H02M 7/219
See application file for complete search history.

(56) References Cited

U.S. PATENT DOCUMENTS

| | | | | |
|---|---|---|---|---|
| 9,344,010 | B2* | 5/2016 | Trainer | H02M 7/219 |
| 9,806,599 | B2* | 10/2017 | Geske | H01T 1/14 |
| 9,954,358 | B2* | 4/2018 | Okaeme | H02H 3/16 |
| 10,044,294 | B2* | 8/2018 | Park | H02M 7/483 |

(Continued)

*Primary Examiner* — Gary L Laxton
(74) *Attorney, Agent, or Firm* — Masuvalley & Partners

(57) ABSTRACT

A sub-module based hybrid converter is provided. By setting a half-controlled charging link of changing full bridge sub-modules from a blocked state to a half-blocked state one by one in a charging process, and raising the voltages of half bridge sub-modules to reach the starting point of a half bridge sub-module based self-powered supply in an uncontrolled stage of the half bridge sub-modules, the starting point of the sub-module based self-powered supply is increased, and the design difficulty of the sub-module based self- powered supply is reduced. The present invention also includes another charging method for a sub-module based hybrid converter.

11 Claims, 6 Drawing Sheets

(56) References Cited

U.S. PATENT DOCUMENTS

| | | | | |
|---|---|---|---|---|
| 10,460,057 B2* | 10/2019 | Li | ............... | G06F 30/367 |
| 2011/0019449 A1* | 1/2011 | Katoh | ............... | H02M 1/088 |
| | | | | 363/124 |
| 2012/0127766 A1* | 5/2012 | Crookes | ............... | H02J 3/1857 |
| | | | | 363/126 |
| 2013/0063995 A1* | 3/2013 | Norrga | ............... | H02M 1/32 |
| | | | | 363/125 |
| 2016/0233762 A1* | 8/2016 | Mathew | ............... | H02M 3/04 |

* cited by examiner

CHARGING METHOD FOR SUB-MODULE BASED HYBRID CONVERTER

RELATED APPLICATIONS

This application is the U.S. National Phase of and claims priority to International Patent Application No. PCT/CN2018/072417, International Filing Date Jan. 12, 2018; which claims benefit of Chinese Patent Application No. 201710029574.5 filed Jan. 16, 2017; both of which are incorporated herein by reference in their entireties.

FIELD OF THE INVENTION

The present invention relates to the field of High Voltage Direct Current (HVDC) transmission and distribution, and in particular, to a charging method for a sub-module based hybrid converter.

BACKGROUND OF THE INVENTION

High Voltage Direct Current (HVDC) transmission uses a voltage source converter, which can independently and rapidly control active power and reactive power, thereby improving system stability, suppressing the fluctuation of system frequency and voltage, and enhancing steady-state performance of a grid-connected AC system. The HVDC transmission has great advantages in the fields of renewable energy grid-connection, distributed generation grid-connection, island power supply, and urban distribution network power supply, etc. As the core device in the HVDC technology, a Modular Multilevel Converter (MMC) is the preferred solution for the current HVDC transmission projects due to its modularization, low switching frequency, and good harmonic performance, etc.

The MMC solution-based HVDC transmission projects which have been put into operation at present adopt a Half Bridge sub-module based Modular Multilevel Converter (HB-MMC) solution. If a short-circuit fault occurs to the DC side of the converter, an AC power supply, an antiparallel diode in the half bridge sub-module, and a short-circuit fault point form a short-circuit loop. Since the high-voltage DC circuit breaker technology and manufacturing process are not yet mature at this stage, it is necessary to isolate the fault circuit by disconnecting the AC circuit breaker, and restarting is made only after the fault current naturally decays to 0. This solution is longer in delay for power restoration, and thus the reliability of power supply is reduced.

To endow a DC fault clearance capability to the converter, domestic and foreign scholars have proposed many novel topologies. The proposer of MMC, German scholar R. Marquart proposes a generalized MMC concept with sub-modules as the basic power units and proposes a novel sub-module topology such as a Full Bridge Sub-Module (FBSM). However, the Full Bridge sub-module based Modular Multilevel Converter (FB-MMC) contains many switching devices and is low in utilization ratio of the switching devices and high in operation loss. With this regard, the patent WO2012103936A1 proposes a Half Bridge and Full Bridge sub-module based hybrid Modular Multilevel Converter (HBFB-MMC) solution, which has the advantages of both HB-MMC and FB-MMC and reduces about ¼ of switching devices compared with the FB-MMC solution while having the DC fault clearance capability, and thus the solution has broad application prospects.

In the HBFB-MMC solution, as shown in FIG. 1, the sub-module based hybrid converter includes at least one phase unit; each phase unit includes an upper bridge arm and a lower bridge arm; the upper bridge arm and the lower bridge arm each include at least one half bridge sub-module, at least one full bridge sub-module, and at least one resistor which are connected in series; and an AC side of the converter is connected to an AC power grid by means of a charging resistor as well as a bypass switch and an incoming switch thereof. The half bridge sub-module includes at least two turn-off devices with antiparallel diodes and an energy storage element. A negative pole of the first turn-off device is connected to a positive pole of the second turn-off device to form a first bridge; a positive pole of the first turn-off device serves as a positive pole of the first bridge; a negative pole of the second turn-off device serves as a negative pole of the first bridge; a connecting point between the first turn-off device and the second turn-off device serves as a first terminal of the half bridge sub-module; the negative pole of the first bridge serves as a second terminal of the half bridge sub-module; the positive pole of the first bridge is connected to a positive pole of the energy storage element, and the negative pole of the first bridge is connected to a negative pole of the energy storage element. The full bridge sub-module includes at least four turn-off devices with antiparallel diodes and an energy storage element. A negative pole of the first turn-off device is connected to a positive pole of the second turn-off device to form a first bridge; a positive pole of the first turn-off device serves as a positive pole of the first bridge; a negative pole of the second turn-off device serves as a negative pole of the first bridge; and a connecting point between the first turn-off device and the second turn-off device serves as a first terminal of the half bridge sub-module. A negative pole of the third turn-off device is connected to a positive pole of the fourth turn-off device to form a second bridge; a positive pole of the third turn-off device serves as a positive pole of the second bridge; a negative pole of the fourth turn-off device serves as a negative pole of the second bridge; a connecting point between the third turn-off device and the fourth turn-off device serves as a second terminal of the full bridge sub-module; the positive pole of the first bridge and the positive pole of the second bridge are connected to the positive pole of the energy storage element, and the negative pole of the first bridge and the negative pole of the second bridge are connected to the negative pole of the energy storage element.

During the uncontrolled charging, all half bridge sub-modules are blocked, and all full bridge sub-modules are blocked. FIG. 5 illustrates a schematic diagram of the uncontrolled charging of the half bridge sub-module. When the current flows in the first terminal, the energy storage element of the half bridge sub-module is connected in series to the charging circuit, and the energy storage element is charged. When the current flows out of the first terminal, the energy storage element of the half bridge sub-module is not connected in series to the charging circuit, and the energy storage element is not charged. FIG. 6 illustrates a schematic diagram of the uncontrolled charging of the full bridge sub-module. When the current flows in the first terminal, the energy storage element of the full bridge sub-module is connected in series to the charging circuit, and the energy storage element is charged. When the current flows out of the first terminal, the energy storage element of the full bridge sub-module is also connected in series to the charging circuit, and the energy storage element is charged. Since the charging duration of the full bridge sub-module is about twice that of the half bridge sub-module, the voltage of the full bridge sub-module is about twice that of the half bridge sub-module during uncontrolled charging. Moreover, in the high-voltage situation, the operations of sub-modules depend on the self-powered supply. In general, the starting voltage of the self-powered supply cannot be low. In this case, the half bridge sub-module is not controlled in the AC uncontrolled charging stage, and the next full-controlled charging process cannot be carried out. Therefore, it is necessary to design a charging method for a sub-module based hybrid converter to raise the voltages of the half bridge sub-modules in the uncontrolled stage of the half bridge sub-modules, thereby increasing the starting point of the sub-module based self-powered supply and reducing the design difficulty of the sub-module based self-powered supply.

SUMMARY OF THE INVENTION

The objective of the present invention is to provide a charging method for a sub-module based hybrid converter according to the characteristics of AC uncontrolled charging of a Half Bridge and Full Bridge sub-module based hybrid Modular Multilevel Converter (HBFB-MMC), so as to implement the smooth charging of the HBFB-MMC without reducing the starting voltage of the sub-module based self-powered supply and complete the starting process.

To achieve the above objective, the present invention adopts the following technical solutions:

A charging method for a sub-module based hybrid converter, where the method includes the following specific charging steps:

step (1): performing, by a converter, an uncontrolled charging process;

step (2): powering a full bridge sub-module based self-powered supply, and half-blocking full bridge sub-modules according to voltages in a descending order after the powering succeeds, the full bridge sub-modules being half-blocked one by one or multiple at a time, and during the process, the remaining full bridge sub-modules that are not bypassed being blocked, and all half bridge sub-modules being maintained in a blocked state; and step (3): performing, by the converter, a full-controlled charging process after all the full bridge sub-modules are half-blocked.

As a further preferred solution of the present invention, each half bridge sub-module includes at least two turn-off devices with antiparallel diodes and an energy storage element; a negative pole of the first turn-off device is connected to a positive pole of the second turn-off device to form a first bridge; a positive pole of the first turn-off device serves as a positive pole of the first bridge; a negative pole of the second turn-off device serves as a negative pole of the first bridge; a connecting point between the first turn-off device and the second turn-off device serves as a first terminal of the half bridge sub-module; the negative pole of the first bridge serves as a second terminal of the half bridge sub-module; the positive pole of the first bridge is connected to a positive pole of the energy storage element, and the negative pole of the first bridge is connected to a negative pole of the energy storage element.

The full bridge sub-module includes at least four turn-off devices with antiparallel diodes and an energy storage element; a negative pole of the first turn-off device is connected to a positive pole of the second turn-off device to form a first bridge; a positive pole of the first turn-off device serves as a positive pole of the first bridge; a negative pole of the second turn-off device serves as a negative pole of the first bridge; a connecting point between the first turn-off device and the second turn-off device serves as a first terminal of the half bridge sub-module; a negative pole of the third turn-off device is connected to a positive pole of the fourth turn-off device to form a second bridge; a positive pole of the third turn-off device serves as a positive pole of the second bridge; a negative pole of the fourth turn-off device serves as a negative pole of the second bridge; a connecting point between the third turn-off device and the fourth turn-off device serves as a second terminal of the full bridge sub-module; the positive pole of the first bridge and the positive pole of the second bridge are connected to a positive pole of the energy storage element, and the negative pole of the first bridge and the negative pole of the second bridge are connected to the negative pole of the energy storage element.

As a further preferred solution of the present invention, the half-blocking the full bridge sub-module in step (2) specifically is: turning on the first turn-off device of the full bridge sub-module, turning off the second, third and fourth turn-off devices or turning off the first, second and third turn-off devices, and turning on the fourth turn-off device.

As a further preferred solution of the present invention, the full-controlled charging process in step (3) refers to blocking some of the half bridge sub-modules, and bypassing some of the half bridge sub-modules; and half-blocking some of the full bridge sub-modules, and bypassing some of the full bridge sub-modules.

As a further preferred solution of the present invention, the bypassing the half bridge sub-module refers to turning off the first turn-off device of the half bridge sub-module and turning on the second turn-off device.

As a further preferred solution of the present invention, the bypassing the full bridge sub-module specifically is: turning off the first and third turn-off devices of the full bridge sub-module, turning on the second and fourth turn-off devices or turning on the first and third turn-off devices, and turning off the second and fourth turn-off devices.

The present invention also discloses a charging method for a sub-module based hybrid converter, where the method includes the following specific charging steps:

step 1: performing, by a converter, an uncontrolled charging process;

step 2: powering a full bridge sub-module based self-powered supply, and bypassing full bridge sub-modules according to voltages in a descending order after the powering succeeds, the full bridge sub-modules being half-blocked one by one or multiple at a time, and during the process, the remaining full bridge sub-modules that are not bypassed being blocked, and all half bridge sub-modules being maintained in a blocked state;

step 3: half-blocking all the full bridge sub-modules and blocking all the half bridge sub-modules after the average voltage of the half bridge sub-modules is K times greater than the average voltage of the full bridge sub-modules, where $0.6<K<1.4$; and step 4: performing, by the converter, a full-controlled charging process.

As a further preferred solution of the present invention, the full-controlled charging process in step 4 specifically is: blocking some of the half bridge sub-modules, and bypassing some of the half bridge sub-modules; and half-blocking some of the full bridge sub-modules, and bypassing some of the full bridge sub-modules.

As a further preferred solution of the present invention, each half bridge sub-module includes at least two turn-off devices with antiparallel diodes and an energy storage element; a negative pole of the first turn-off device is connected to a positive pole of the second turn-off device to form a first bridge; a positive pole of the first turn-off device serves as a positive pole of the first bridge; a negative pole of the second turn-off device serves as a negative pole of the first bridge; a connecting point between the first turn-off device and the second turn-off device serves as a first terminal of the half bridge sub-module; the negative pole of the first bridge serves as a second terminal of the half bridge sub-module; the positive pole of the first bridge is connected to a positive pole of the energy storage element, and the negative pole of the first bridge is connected to a negative pole of the energy storage element.

The full bridge sub-module includes at least four turn-off devices with antiparallel diodes and an energy storage element; a negative pole of the first turn-off device is connected to a positive pole of the second turn-off device to form a first bridge; a positive pole of the first turn-off device serves as a positive pole of the first bridge; a negative pole of the second turn-off device serves as a negative pole of the first bridge; a connecting point between the first turn-off device and the second turn-off device serves as a first terminal of the half bridge sub-module; a negative pole of the third turn-off device is connected to a positive pole of the fourth turn-off device to form a second bridge; a positive pole of the third turn-off device serves as a positive pole of the second bridge; a negative pole of the fourth turn-off device serves as a negative pole of the second bridge; a connecting point between the third turn-off device and the fourth turn-off device serves as a second terminal of the full bridge sub-module; the positive pole of the first bridge and the positive pole of the second bridge are connected to a positive pole of the energy storage element, and the negative pole of the first bridge and the negative pole of the second bridge are connected to the negative pole of the energy storage element.

As a further preferred solution of the present invention, the half-blocking the full bridge sub-module specifically is: turning on the first turn-off device of the full bridge sub-module, turning off the second, third and fourth turn-off devices or turning off the first, second and third turn-off devices, and turning on the fourth turn-off device.

As a further preferred solution of the present invention, the bypassing the half bridge sub-module specifically is: turning off the first turn-off device of the half bridge sub-module and turning on the second turn-off device.

As a further preferred solution of the present invention, the bypassing the full bridge sub-module specifically is: turning off the first and third turn-off devices of the full bridge sub-module, turning on the second and fourth turn-off devices or turning on the first and third turn-off devices, and turning off the second and fourth turn-off devices.

By using the above solutions, the present invention has the following beneficial effects:

(1) the charging method provided by the present invention can raise the voltages of the half bridge sub-modules in the uncontrolled stage of the half bridge sub-modules;

(2) the charging method provided by the present invention can increase the starting point of the sub-module based self-powered supply, reduce the design difficulty of the sub-module based self-powered supply, achieve the smooth charging of the HBFB-MMC without reducing the starting voltage of the sub-module based self-powered supply, and complete the starting process.

DETAILED DESCRIPTION OF THE EMBODIMENTS

The technical solutions of the present invention are described below with reference to the accompanying drawings and the specific embodiments.

Figure 1:
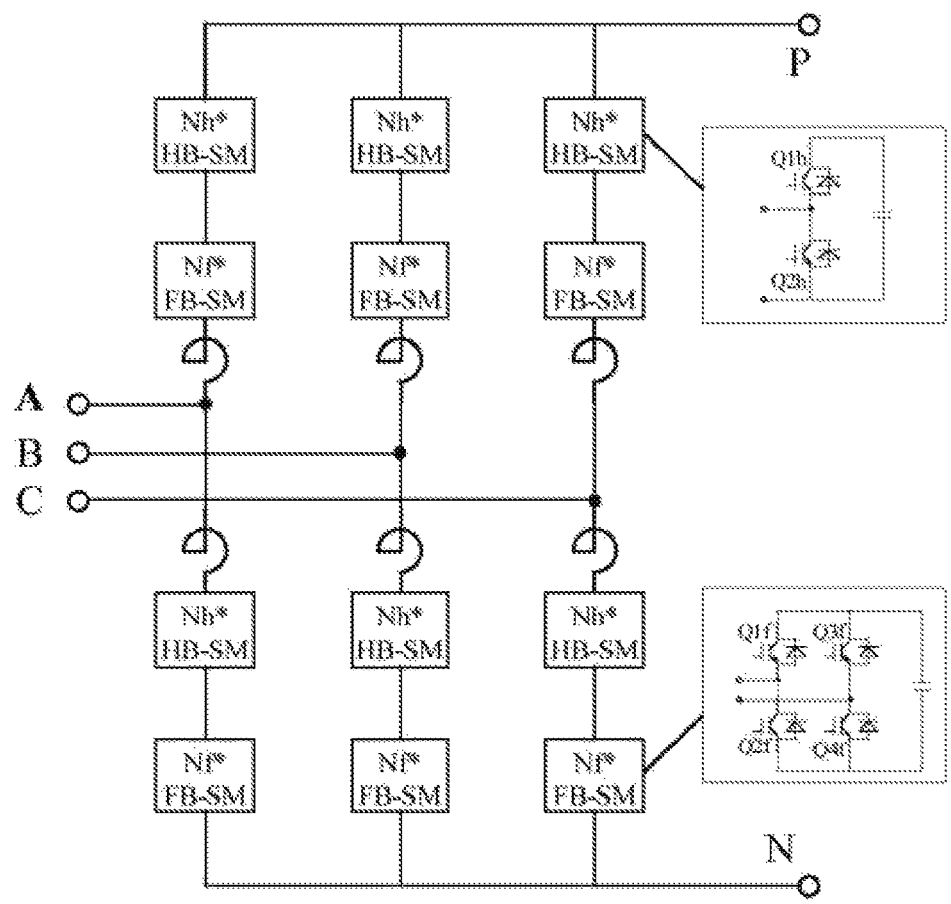
FIG. 1 shows a half bridge and full bridge sub-module based hybrid modular multilevel converter.

The sub-module based hybrid converter mentioned in the following embodiments is shown in FIG. 1, where a first turn-off device Q1$h$ and a second turn-off device Q2$h$ of a half bridge sub-module, as well as a first turn-off device Q1$f$, a second turn-off device Q2$f$, a third turn-off device Q3$f$, and a fourth turn-off device Q4$f$ of a full bridge sub-module are shown.

Figure 2:
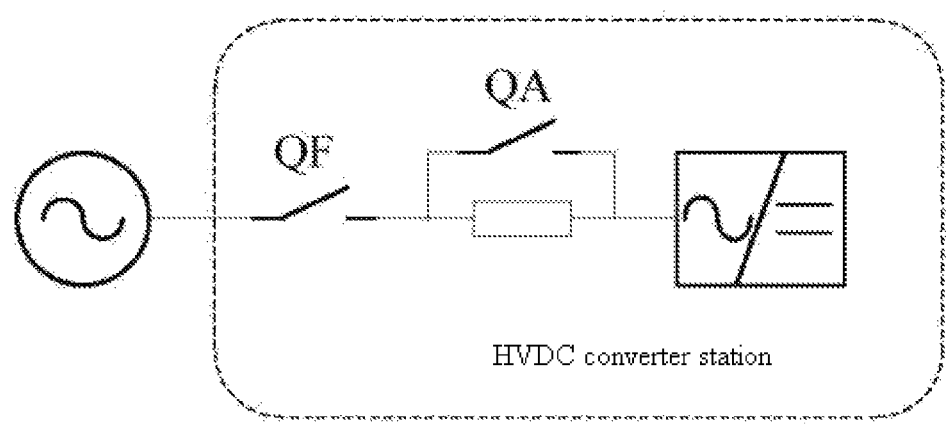
FIG. 2 is a single line diagram of a HVDC converter station.
Figure 3:
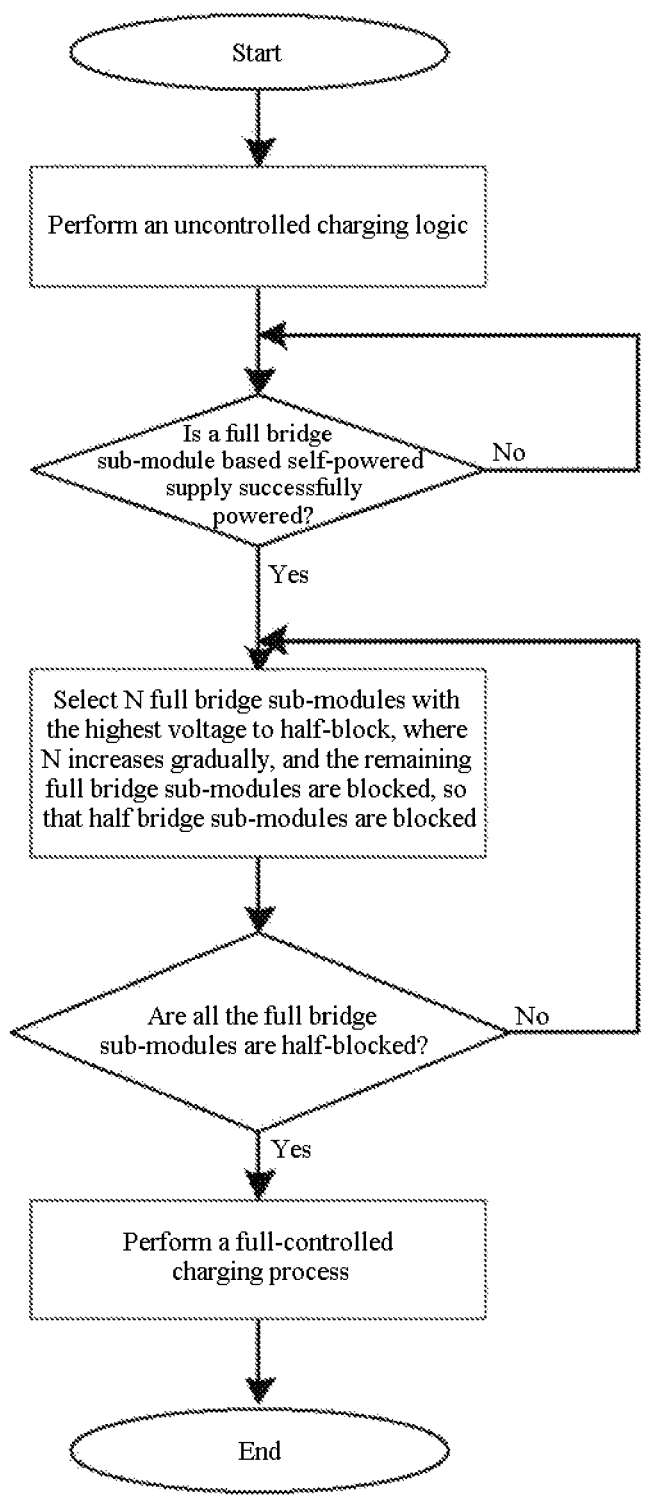
FIG. 3 is a first flowchart of charging.

A charging method for a sub-module based hybrid converter, where an AC side of the converter is connected to an AC power grid by means of a charging resistor as well as a bypass switch and an incoming switch thereof, as shown in FIG. 2; the charging steps are shown in FIG. 3, and the specific steps are as follows:

(1) closing the incoming switch QF so that the charging resistor of a converter valve performs an uncontrolled charging process, closing the bypass switch QA after the charging current is less than a set value Iset or the DC voltage is greater than a set value Uset, and bypassing the charging resistor, where Iset<0.1 pu and Uset>0, and in this case, the voltage of a full bridge sub-module is about twice that of a half bridge sub-module, and the voltages of the both are low;

(2) selecting N full bridge sub-modules with the highest voltage to half-block after a full bridge sub-module based self-powered supply is successfully powered, where N increases from 0 gradually, the remaining full bridge sub-modules are blocked, all half bridge sub-modules are blocked, as N increases gradually, the average voltage of the half bridge sub-modules increases gradually, the average of the full bridge sub-modules also increases gradually, and the two voltages approach gradually, so that the voltages of all the full bridge sub-modules are equalized; and (3) performing a full-controlled charging process after all the full bridge sub-modules are half-blocked and when the average voltage of the half bridge sub-modules approaches the average voltage of the full bridge sub-modules.

Figure 7:
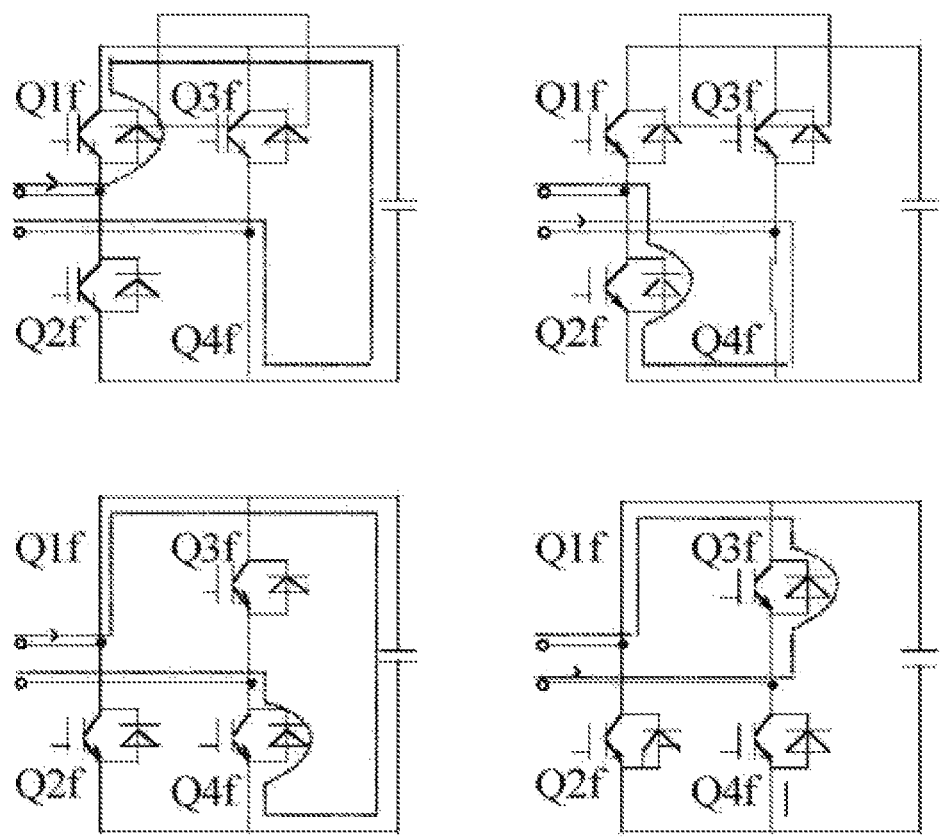
FIG. 7 is a schematic diagram of half-blocking a full bridge sub-module.

The half-blocking the full bridge sub-module refers to turning off Q1$f$, Q2$f$, Q3$f$, turning on Q4$f$ or turning off Q2$f$, Q3$f$, Q4$f$, and turning on Q1$f$, as shown in FIG. 7.

Figure 8:
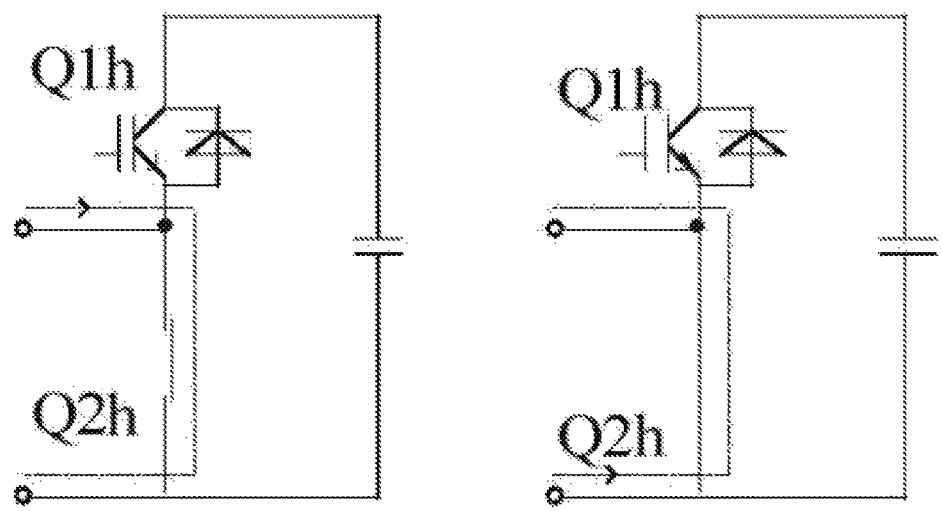
FIG. 8 is a schematic diagram of bypassing a half bridge sub-module.
Figure 9:
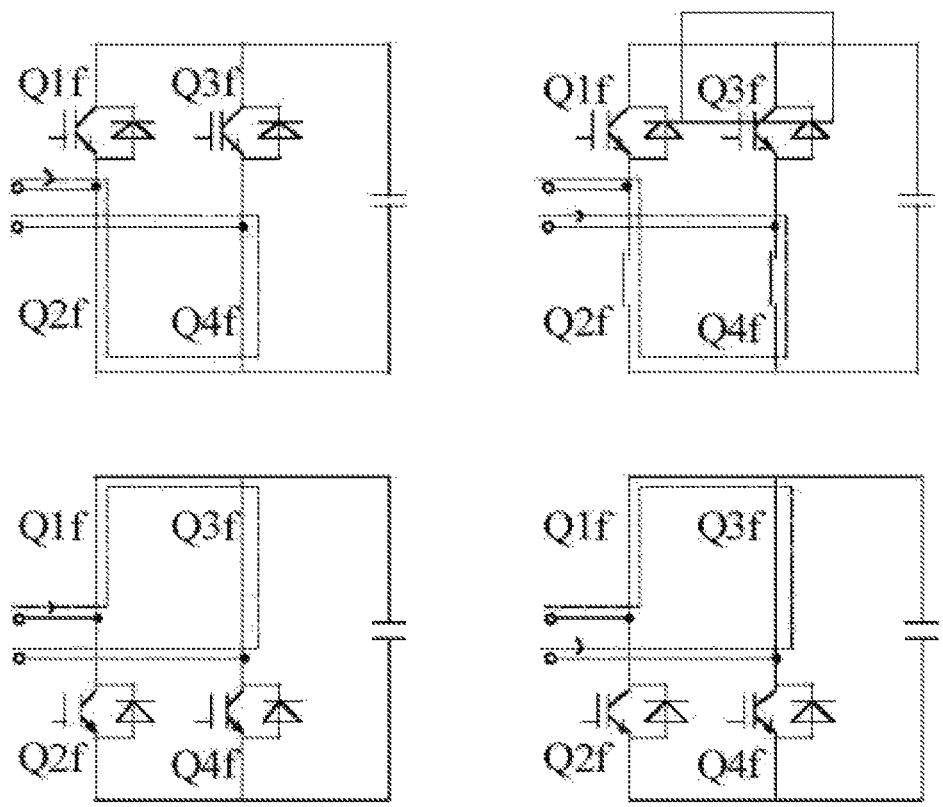
FIG. 9 is a schematic diagram of bypassing a full bridge sub-module.

The bypassing the half bridge sub-module refers to turning off Q1$h$ and turning on Q2$h$, as shown in FIG. 8. The bypassing the full bridge sub-module refers to turning off Q1$f$ and Q3$f$, turning on Q2$f$ and Q4$f$ or turning off Q2$f$ and Q4$f$, and turning on Q1$f$ and Q3$f$, as shown in FIG. 9.

In the full-controlled charging process, the voltage equalization of the two types of sub-modules is taken as a control target. If the half bridge sub-modules and the full bridge sub-modules are sorted in a concentrated manner, these sub-modules operate according to the voltage equalization strategy and gating method provided in the existing literature; if the half bridge sub-modules and the full bridge sub-modules are sorted in groups, then these modules are distributed according to the total bypass number of each bridge arm, and then operate according to the voltage equalization strategy and gating method provided in the existing literature.

Figure 4:
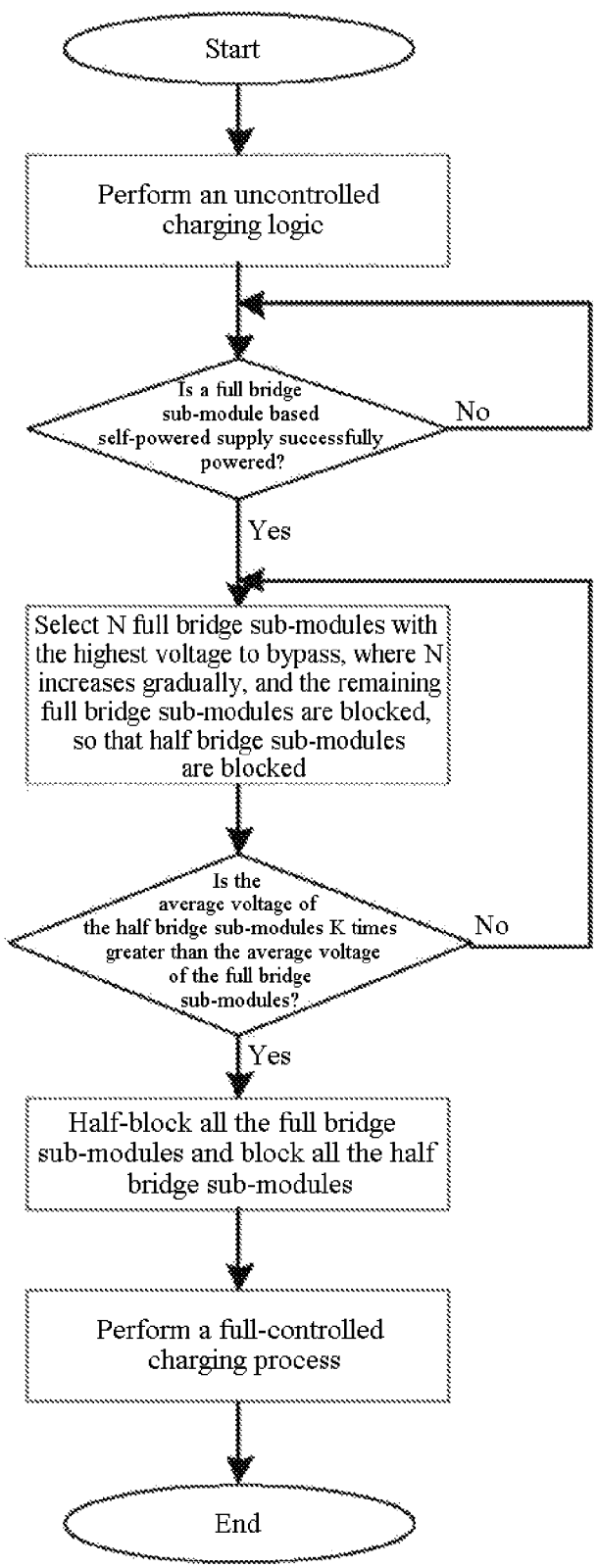
FIG. 4 is a second flowchart of charging.
Figure 5:
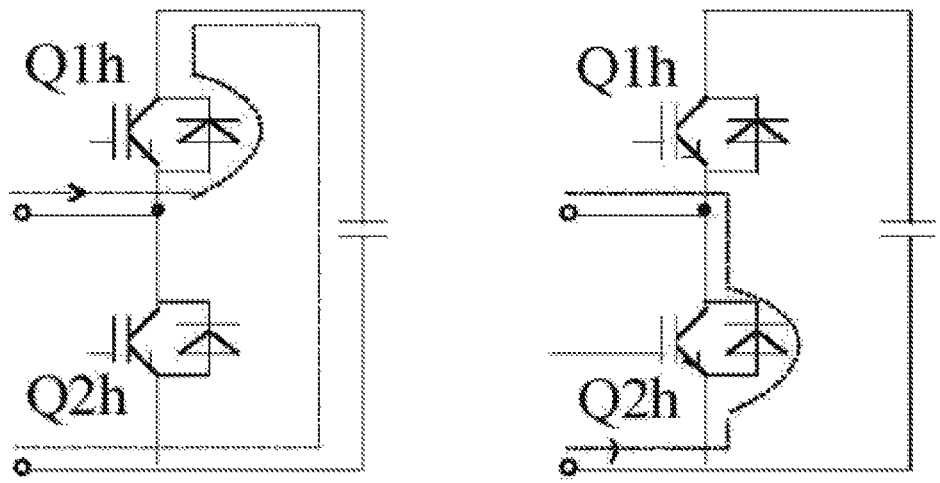
FIG. 5 is a schematic diagram of blocking a half bridge sub-module.
Figure 6:
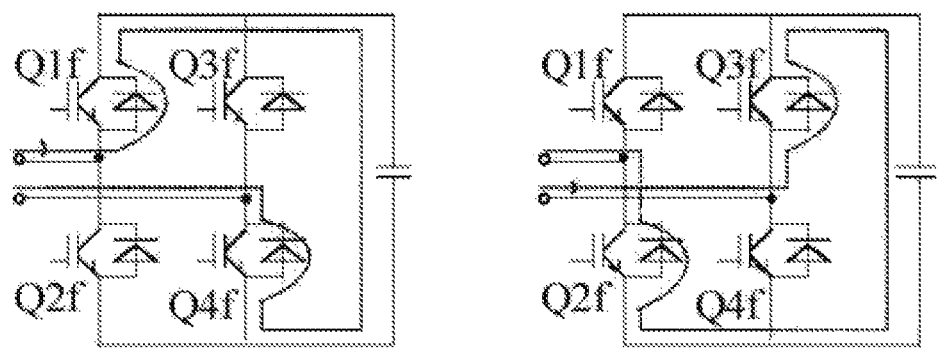
FIG. 6 is a schematic diagram of blocking a full bridge sub-module.

A charging method for a sub-module based hybrid converter, where an AC side of the converter is connected to an AC power grid by means of a charging resistor as well as a bypass switch and an incoming switch thereof, as shown in FIG. 2; the charging steps are shown in FIG. 4, and the specific steps are as follows:

(1) closing the incoming switch QF so that the charging resistor of a converter valve performs an uncontrolled charging process, closing the bypass switch QA after the charging current is less than a set value Iset or the DC voltage is greater than a set value Uset, and bypassing the charging resistor, where Iset<0.1 pu and Uset>0, and in this case, the voltage of a full bridge sub-module is about twice that of a half bridge sub-module, and the voltages of the both are low;

(2) selecting N full bridge sub-modules with the highest voltage to bypass after a full bridge sub-module based self-powered supply is successfully powered, where N increases from 0 gradually, the remaining full bridge sub-modules are blocked, all half bridge sub-modules are blocked, and as N increases gradually, the average voltage of the half bridge sub-modules increases gradually, and the voltages of all the full bridge sub-modules are equalized;

(3) half-blocking all the full bridge sub-modules and blocking all the half bridge sub-modules after the average voltage of the half bridge sub-modules is K times greater than the average voltage of the full bridge sub-modules, where 0.6<K<1.4; and (4) performing a full-controlled charging process.

The half-blocking the full bridge sub-module refers to turning off Q1$f$, Q2$f$, Q3$f$, turning on Q4$f$ or turning off Q2$f$, Q3$f$, Q4$f$, and turning on Q1$f$, as shown in FIG. 7.

The bypassing the half bridge sub-module refers to turning off Q1$h$ and turning on Q2$h$, as shown in FIG. 8. The bypassing the full bridge sub-module refers to turning off Q1$f$ and Q3$f$, turning on Q2$f$ and Q4$f$ or turning off Q2$f$ and Q4$f$, and turning on Q1$f$ and Q3$f$, as shown in FIG. 9.

In the full-controlled charging process, the voltage equalization of the two types of sub-modules is taken as a control target. If the half bridge sub-modules and the full bridge sub-modules are sorted in a concentrated manner, these sub-modules operate according to the voltage equalization strategy and gating method provided in the existing literature; if the half bridge sub-modules and the full bridge sub-modules are sorted in groups, then these modules are distributed according to the total bypass number of each bridge arm, and then operate according to the voltage equalization strategy and gating method provided in the existing literature.

The foregoing embodiments are used to explain the technical idea of the present invention, but are not intended to limit the scope of protection of the preset invention. Any modification made based on the technical solutions according to the technical idea of the present invention shall fall within the scope of protection of the present invention.

The invention claimed is:

1. A charging method for a hybrid converter based on half bridge sub-modules and full bridge sub-modules, wherein the method comprises the steps:

step (1): performing, by a converter, a charging process;

step (2): powering a self-powered supply of the full bridge sub-modules and half-blocking the full bridge sub-modules, half-blocking the full bridge sub-modules comprising the steps of:

turning on a first turn-off device of the full bridge sub-modules, turning off a second, third and fourth turn-off devices or turning off the first, second and third turn-off devices, and turning on the fourth turn-off device, then based on a sequence from high to low of a voltage of each of the full bridge sub-modules, starting with a full bridge sub-module having a greatest voltage of the full bridge sub-modules, and continuing with other full bridge sub-modules, after a powering succeeds, the full bridge sub-modules being half-blocked one by one or multiple at a time, and during the process, other full bridge sub-modules that are not bypassed being blocked, and all half bridge sub-modules being maintained in a blocked state; and step (3): performing, by the converter, a full-controlled charging process after all the full bridge sub-modules are half-blocked.

2. The charging method for the hybrid converter based on half bridge sub-modules and full bridge sub-modules of claim 1, wherein each of the half bridge sub-modules comprises at least two turn-off devices with antiparallel diodes and an energy storage element;

a negative pole of the first turn-off device is connected to a positive pole of the second turn-off device to form a first bridge;

a positive pole of the first turn-off device serves as a positive pole of the first bridge;

a negative pole of the second turn-off device serves as a negative pole of the first bridge;

a connecting point between the first turn-off device and the second turn-off device serves as a first terminal of the half bridge sub-modules;

the negative pole of the first bridge serves as a second terminal of the half bridge sub-modules;

the positive pole of the first bridge is connected to a positive pole of the energy storage element, and the negative pole of the first bridge is connected to a negative pole of the energy storage element;

each of the full bridge sub-modules comprises at least four turn-off devices with antiparallel diodes and an energy storage element;

a negative pole of the first turn-off device is connected to a positive pole of the second turn-off device to form a first bridge;

a positive pole of the first turn-off device serves as a positive pole of the first bridge;

a negative pole of the second turn-off device serves as a negative pole of the first bridge;

a connecting point between the first turn-off device and the second turn-off device serves as a first terminal of the half bridge sub-modules;

a negative pole of the third turn-off device is connected to a positive pole of the fourth turn-off device to form a second bridge;

a positive pole of the third turn-off device serves as a positive pole of the second bridge;

a negative pole of the fourth turn-off device serves as a negative pole of the second bridge;

a connecting point between the third turn-off device and the fourth turn-off device serves as a second terminal of the full bridge sub-modules;

the positive pole of the first bridge and the positive pole of the second bridge are connected to a positive pole of the energy storage element, and the negative pole of the first bridge and the negative pole of the second bridge are connected to the negative pole of the energy storage element.

3. The charging method for the hybrid converter based on half bridge sub-modules and full bridge sub-modules of claim 1, wherein the full-controlled charging process in step (3) refers to blocking some of the half bridge sub-modules, and bypassing some of the half bridge sub-modules; and
half-blocking some of the full bridge sub-modules, and bypassing some of the full bridge sub-modules.

4. The charging method for the hybrid converter based on half bridge sub-modules and full bridge sub-modules of claim 2, wherein the bypassing the half bridge sub-modules refers to turning off the first turn-off device of the half bridge sub-modules and turning on the second turn-off device.

5. The charging method for the hybrid converter based on half bridge sub-modules and full bridge sub-modules of claim 2, wherein bypassing the full bridge sub-modules is performed by:
turning off the first and third turn-off devices of the full bridge sub-modules, turning on the second and fourth turn-off devices or turning on the first and third turn-off devices, and turning off the second and fourth turn-off devices.

6. A charging method for a hybrid converter based on half bridge sub-modules and full bridge sub-modules, wherein the method comprises the steps:
step 1: performing, by a converter, a charging process;
step 2: powering a self-powered supply of the full bridge sub-modules, and bypassing the full bridge sub-modules starting with a full-bridge sub-module having a greatest voltage of the full-bridge sub-modules, based on a sequence from high to low of a voltage of each of the full bridge sub-modules and continuing with other full-bridge sub-modules after a powering succeeds, the full bridge sub-modules being half-blocked one by one or multiple at a time, and during the process, other full bridge sub-modules that are not bypassed being blocked, and all half bridge sub-modules being maintained in a blocked state; and
step 3: half-blocking all the full bridge sub-modules and blocking all the half bridge sub-modules after an average voltage of the half bridge sub-modules is K times greater than an average voltage of the full bridge sub-modules, wherein 0.6<K <1.4; and
step 4: performing, by the converter, a full-controlled charging process.

7. The charging method for the hybrid converter based on half bridge sub-modules and full bridge sub-modules of claim 6, wherein the full-controlled charging process in step 4 specifically is performed by:
blocking some of the half bridge sub-modules, and bypassing some of the half bridge sub-modules; and
half-blocking some of the full bridge sub-modules, and bypassing some of the full bridge sub-modules.

8. The charging method for the hybrid converter based on half bridge sub-modules and full bridge sub-modules of claim 6, wherein each of the half bridge sub-modules comprises at least two turn-off devices with antiparallel diodes and an energy storage element;
a negative pole of the first turn-off device is connected to a positive pole of the second turn-off device to form a first bridge;
a positive pole of the first turn-off device serves as a positive pole of the first bridge;
a negative pole of the second turn-off device serves as a negative pole of the first bridge;
a connecting point between the first turn-off device and the second turn-off device serves as a first terminal of the half bridge sub-modules;
the negative pole of the first bridge serves as a second terminal of the half bridge sub-modules;
the positive pole of the first bridge is connected to a positive pole of the energy storage element, and the negative pole of the first bridge is connected to a negative pole of the energy storage element.

9. The charging method for the hybrid converter based on half bridge sub-modules and full bridge sub-modules of claim 8, wherein half-blocking the full bridge sub-modules is performed by:
turning on the first turn-off device of the full bridge sub-modules, turning off the second, third and fourth turn-off devices or turning off the first, second and third turn-off devices, and turning on the fourth turn-off device.

10. The charging method for the hybrid converter based on half bridge sub-modules and full bridge sub-modules of claim 7, wherein bypassing the half bridge sub-modules is performed by:
turning off the first turn-off device of the half bridge sub-modules and turning on the second turn-off device.

11. The charging method for the hybrid converter based on half bridge sub-modules and full bridge sub-modules of claim 8, wherein bypassing the full bridge sub-modules is performed by:
turning off the first and third turn-off devices of the full bridge sub-modules, turning on the second and fourth turn-off devices or turning on the first and third turn-off devices, and turning off the second and fourth turn-off devices.

* * * * *